United States Patent [19]

Takei

[11] Patent Number: 5,540,113
[45] Date of Patent: Jul. 30, 1996

[54] DRIVE APPARATUS EQUIPPED WITH A BALL SCREW

[75] Inventor: Seiji Takei, Kanagawa, Japan

[73] Assignee: Nippon Thompson Co., Ltd., Tokyo, Japan

[21] Appl. No.: 306,477

[22] Filed: Sep. 15, 1994

[30] Foreign Application Priority Data

Sep. 20, 1993 [JP] Japan .................. 5-055518 U

[51] Int. Cl.⁶ .................................................. F16H 25/12
[52] U.S. Cl. ................................. 74/424.8 B; 74/57
[58] Field of Search ................... 74/424.4 B, 89.15, 74/57, 58

[56] References Cited

U.S. PATENT DOCUMENTS

| | | | |
|---|---|---|---|
| 3,563,107 | 2/1971 | Nilsson | 74/424.8 A |
| 4,031,765 | 6/1977 | Metz | 74/57 |
| 4,210,063 | 7/1980 | Grossman | 74/57 |
| 4,369,011 | 1/1983 | Ploss | 74/424.8 A |
| 4,449,417 | 5/1984 | Sasaki | 74/424.8 A |
| 4,666,026 | 5/1987 | Poulin | 192/141 |

FOREIGN PATENT DOCUMENTS

| | | | |
|---|---|---|---|
| 58-160665 | 9/1983 | Japan | 74/424.8 A |
| 3-47787 | 9/1989 | Japan . | |
| 4131550 | 5/1992 | Japan | 74/424.8 A |
| 900124 | 7/1962 | United Kingdom | 74/424.8 A |

*Primary Examiner*—Charles A. Marmor
*Assistant Examiner*—David Fenstermacher
*Attorney, Agent, or Firm*—Sughrue, Mion, Zinn, Macpeak & Seas; Richard C. Turner

[57] ABSTRACT

A drive apparatus equipped with a ball screw and has nuts fitted onto a screw shaft to be approaching each other. Ends of the nuts are coupled to each other while being able to rotate freely with respect to each other. The screw shaft has two opposing threads formed thereon which are engaged respectively with the nuts.

5 Claims, 3 Drawing Sheets

DRIVE APPARATUS EQUIPPED WITH A BALL SCREW

BACKGROUND OF THE INVENTION

1. Field of the Invention

The present invention relates to a drive apparatus equipped with a ball screw.

2. Description of the Prior Art

An example of this type of drive apparatus of the prior art is disclosed in Utility Model Laid-Open Publication No. 3-47787, a schematic drawing of which is shown in FIG. 1. As shown in the drawing, the drive apparatus is equipped with screw shaft 1, in which are formed two types of left and right screw grooves 1a and 1b in a state in which they are mutually intersecting. Two nuts 2 and 3 fit loosely onto the screw shaft 1 and are provided with ball circulating paths (not shown) corresponding to each of said screw grooves 1a and 1b, respectively, and a plurality of balls (not shown) are arranged and contained within the ball circulating path which circulate accompanying relative rotation of the screw shaft 1 and nuts 2 and 3.

The above-mentioned nuts 2 and 3 are able to rotate freely as a result of being supported at both ends by two ball bearings 6 and 7, respectively. Furthermore, each of the ball bearings 6 and 7 is supported by body 8a and support member 8 composed of covers 8b and 8c. In addition, in the drawing, reference numeral 9 indicates an outer ring collar which serves to prevent displacement of the outer rings of ball bearings 6 and 7.

Timing pulleys 10 and 11 are respectively fixed in the centers of the above-mentioned nuts 2 and 3. In addition, two stepping motors 13 and 14 are attached to the upper portion of support member 8 by means of attachment brackets 15 and 16, and timing pulleys 18 and 19 are fitted onto the output shafts of each of the stepping motors 13 and 14. Timing belts 21 and 22 are wrapped between mutually corresponding timing pulleys 10 and 18 and mutually corresponding timing pulleys 11 and 19, respectively.

In the drive apparatus having this constitution, as shown in the drawing, robot hand 23 to be driven is attached to the end of, for example, screw shaft 1. In this state, as a result of operating both stepping motors 13 and 14 and suitably changing the directions of rotation and rotating speeds of each nut 2 and 3, backward and forward movement, rotating movement as well as movement combining these, motions can be performed as desired with screw shaft 1, and therefore robot hand 23. The relationship of movement between nuts 2 and 3 and screw shaft 1 is as shown below.

| Difference in rotating speeds between both nuts | No difference | No difference | Different rotating speeds |
|---|---|---|---|
| Direction of rotation of both nuts | Same direction | Opposite direction | Same direction |
| State of movement of screw shaft | Rotation at that position | Forward and backward movement only, no rotation | Forward and backward movement while rotating |

In the drive apparatus having the above-mentioned constitution, since forward and backward movement and rotating movement of robot hand 23 to be driven, along with compound movements, can be performed by only controlling the rotation of two nuts 2 and 3, the structure of the apparatus is simple, and there are many locations at which parts can be shared, thus offering the advantage of reduced costs and so forth. However, adequate results have not yet to be obtained with respect to the problem of reducing the size of the apparatus, which has recently become increasingly important.

SUMMARY OF THE INVENTION

In consideration of the above-mentioned problems of the prior art, the object of the present invention is to provide a drive apparatus that achieves compact size.

The present invention is a drive apparatus equipped with: a screw shaft wherein two types of left and right screw grooves are formed in a state in which they mutually intersect; a plurality of nuts fitted loosely onto said screw shaft and provided with ball circulating paths corresponding to each of said screw grooves, respectively; a plurality of balls arranged and contained within said ball circulating paths which circulate accompanying relative rotation of said screw shaft and nuts; supporting mechanisms which support each of said nuts so as to be able to rotate freely; and driving devices able to individually rotate and drive each of said nuts; wherein, each of said nuts is arranged in close proximity to each other, and their corresponding ends are joined while be allowed to freely rotate relative to each other.

DESCRIPTION OF THE PREFERRED EMBODIMENTS

The following provides an explanation of a drive apparatus as an embodiment of the present invention with reference to the attached drawings.

Figure 2:
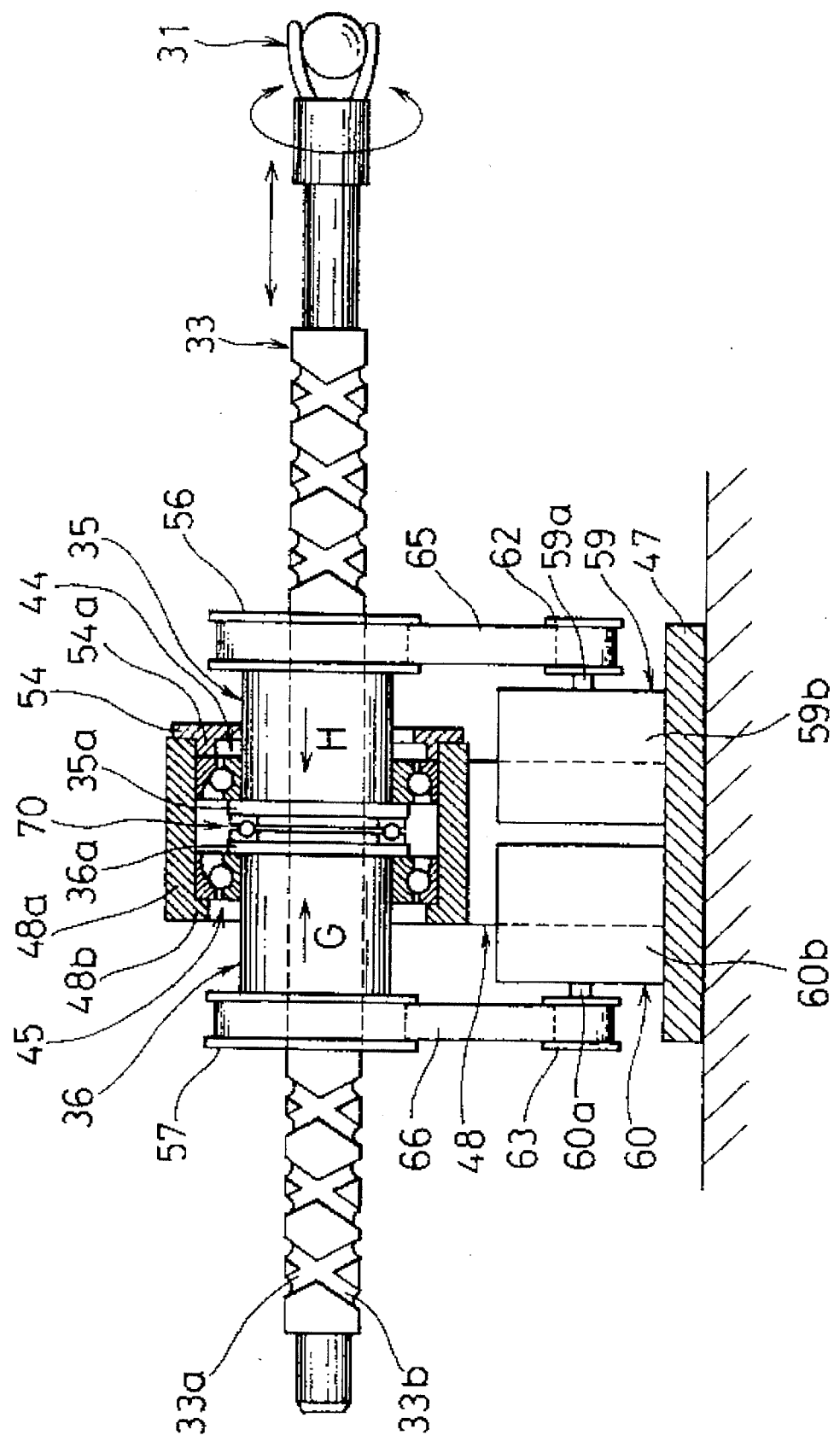
FIG. 2 is a front view, including a partial cross-section of a drive apparatus as an embodiment of the present invention.
Figure 3:
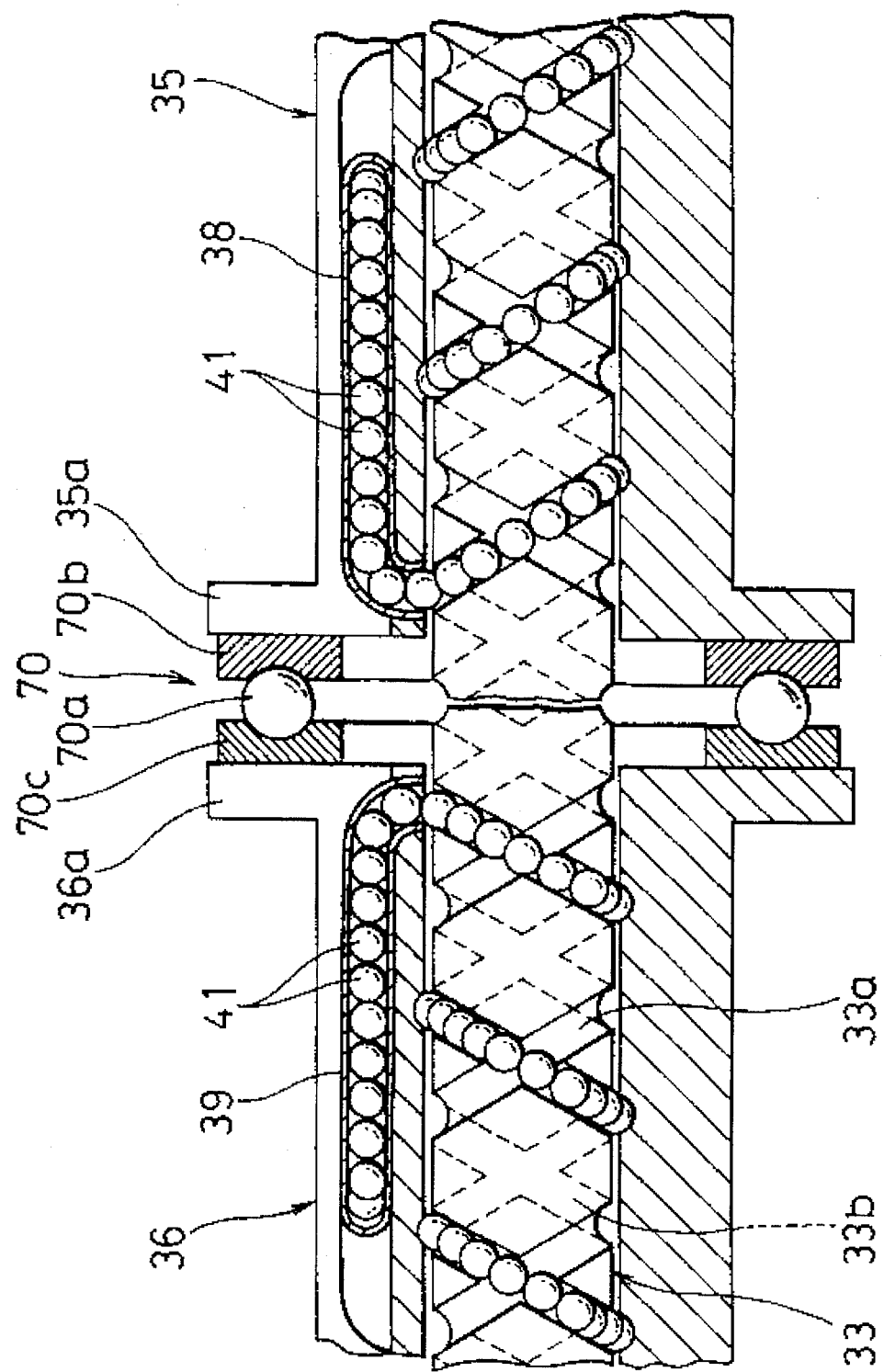
FIG. 3 is a longitudinal cross-sectional view of portion of the drive apparatus shown in FIG. 2.

As shown in FIG. 2, the drive apparatus is equipped with a single screw shaft 33 to which a driven object in the form of robot hand 31 is attached to one end, and a ball screw composed of two nuts 35 and 36, respectively formed into roughly the shape of a cylinder, and which are fitted loosely onto the screw shaft 33. Two types of left and right screw grooves 33a and 33b are formed in said screw shaft 33 in a state in which they are mutually intersecting. As shown in FIG. 3, ball circulating paths corresponding to each of the screw grooves 33a and 33b are respectively formed in both nuts 35 and 36 by providing each with return tubes 38 and 39. A plurality of balls 41 are arranged and contained within these ball circulating paths so that the balls 41 circulate accompanying relative rotation of screw shaft 33 and both nuts 35 and 36.

Both of the above-mentioned nuts 35 and 36 are respectively supported by single row, angular radial ball bearings 44 and 45 in the vicinity of their mutually opposing ends as shown, for example, in FIG. 2. In addition, these radial ball bearings 44 and 45 are supported by being fitted inside cylindrical support 48a formed on a support member in the form of bracket 48 fixed on base 47. More specifically, both radial ball bearings 44 and 45 are arranged so that the sides given by the contact angle due to the angular shape of each are facing each other. Flanges 35a and 36a are formed on the mutually opposing ends of both nuts 35 and 36, and each inner ring of both radial ball bearings 44 and 45 makes contact with the flanges 35a and 36a, respectively. In addition, as shown in FIG. 2, circular shoulder 48b is formed in the inner circumference of one end of the above-mentioned support 48a, and the shoulder 48b makes contact with the outer ring of one radial ball bearing 45. In addition, cover 54 is provided which blocks the opening on the other end of the above-mentioned support 48a. Circular projection 54a is formed on the inside of the cover 54, and the projection 54a makes contact with the outer ring of the other radial ball bearing 44. Although not shown in the drawings, together with a lubricant such as grease being filled into the internal space demarcated by the above-mentioned support 48a and cover 54, sealing is performed to prevent leakage of the lubricant as well as infiltration of dust and debris from the outside. Furthermore, the above-mentioned bracket 48 together with both of the above-mentioned radial ball bearings 44 and 45 are generically referred to as a support mechanism.

As shown in FIG. 2, timing pulleys 56 and 57 are each fixed coaxially on each of the outside ends of both of the above-mentioned nuts 35 and 36, namely the ends opposite from the mutually opposing ends. In addition, as is shown in the same drawing, two stepping motors 59 and 60 are attached to base 47 so that each of their output shafts 59a and 60a are mutually facing in the opposite direction. Small timing pulleys 62 and 63 are respectively fit onto each of the output shafts 59a and 60a. Timing belts 65 and 66 are wrapped between the above-mentioned timing pulleys 56 and 57 and these timing pulleys 62 and 63.

A driving force application device, which applies driving force to timing pulleys 56 and 57 provided on the above-mentioned nuts 35 and 36, is composed of each of the above-mentioned stepping motors 59 and 60, timing pulleys 62 and 63 respectively fit onto each of the output shafts 59a and 60a, and timing belts 65 and 66. In addition, a driving device, which is able to individually rotate and drive each of the above-mentioned nuts 35 and 36, is composed of the driving force application device and the timing pulleys 56 and 57.

As is clear from FIGS. 2 and 3, both nuts 35 and 36 are arranged mutually approaching each other, and their ends are joined while being allowed to rotate freely relative to each other by means of, for example, flat back face type thrust ball bearing 70. More specifically, as is clear from FIG. 3, each of two bearing washers 70a and 70c positioned on both sides of balls 70a of the thrust ball bearing 70 are fixed to the end surfaces of nuts 35 and 36 by means of welding or the like As a result of this constitution, the driving force generating portion, which includes each of the nuts 35 and 36 as well as stepping motors 59 and 60 which rotate the nuts 35 and 36, can be made to be compact in size. A compact size is particularly achieved in the direction along the central axis of rotation of each nut 35 and 36. Furthermore, the end surfaces of nuts 35 and 36 may be joined directly in the form of a sliding bearing without providing the above-mentioned thrust ball bearing 70. However, the relative rotation of both nuts 35 and 36 is extremely smooth as a result of juxtapositioning thrust ball bearing 70 between their end surfaces as described above.

Figure 1:
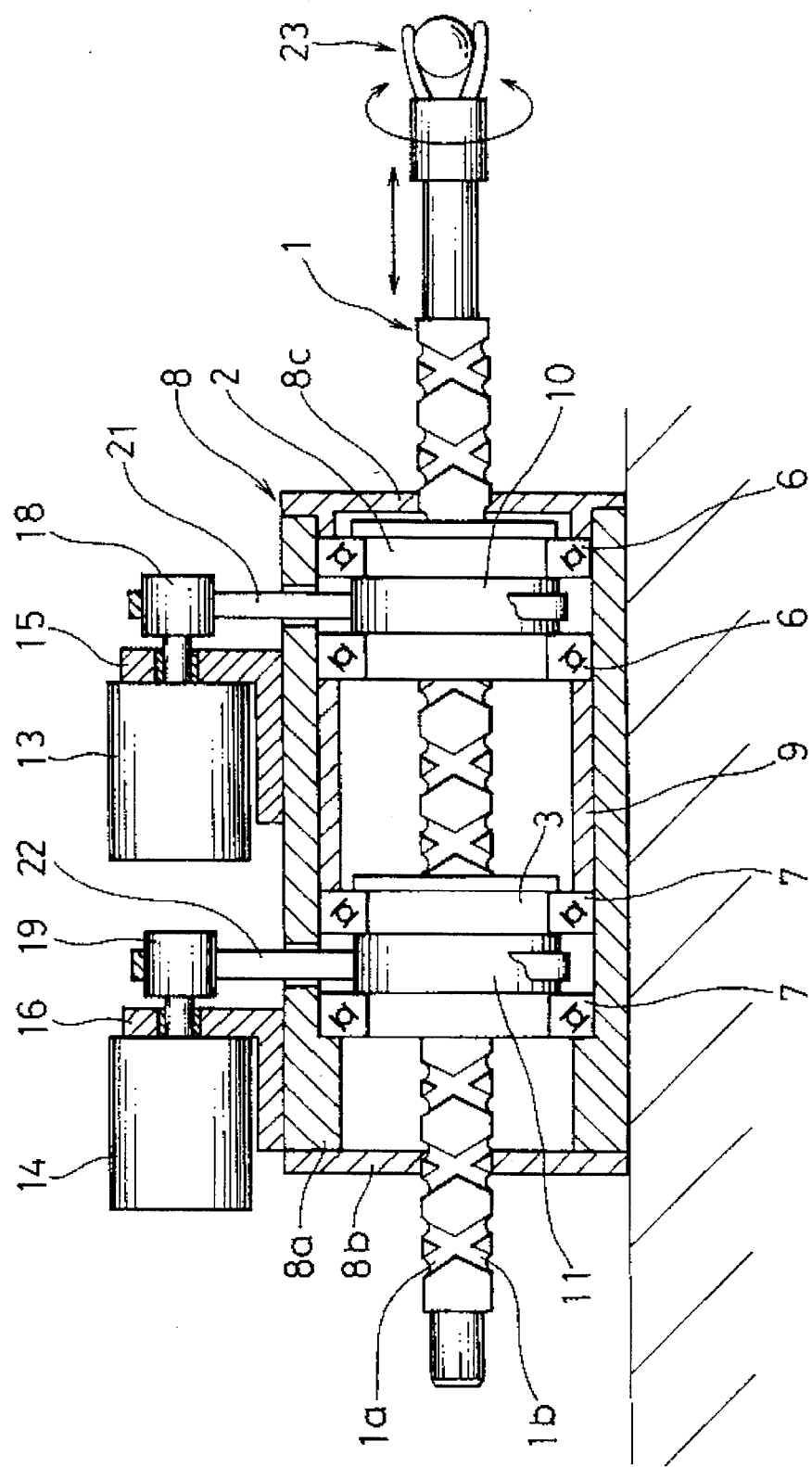
FIG. 1 is a front view, including a partial cross-section of a drive apparatus of the prior art.

However, in a constitution wherein the ends of two nuts 35 and 36 are joined by means of thrust ball bearing 70, it is desirable to apply in advance prescribed axial loads as shown with arrows G and H in FIG. 2 to prevent defective operation and so forth caused by even a slight amount of play between balls 70a and bearing washers 70b and 70c of the thrust ball bearing 70. Angular radial ball bearings 44 and 45 described above are employed for receiving the reaction of the radial load as well as this applied axial load. Moreover, each of the sides given by the contact angle resulting from the angular shape is arranged so as to be facing each other. Although various other constitutions can be considered for simultaneously bearing a radial load and an axial load, according to the above-mentioned constitution, these loads can be borne simply by providing two angular radial ball bearings. Consequently, the number of parts is reduced. Moreover, since both radial ball bearings 44 and 45 are provided in compact form in the vicinity of the mutually opposing ends of nuts 35 and 36, the structure of the apparatus can be simplified and made to be more compact. In addition, although the above-mentioned bearing of the axial load is possible as a result of the inner and outer rings of both radial ball bearings 44 and 45 being pushed in the axial direction by flanges 35a and 36a of nuts 35 and 36, shoulder 48a of support 48a, and projection 54a of cover 54 as previously described, since an outer ring collar 9 like that juxtapositioned between ball bearings 6 and 7 in the drive apparatus of the prior art shown in FIG. 1 is not required in this constitution, the number of parts can be reduced, thus achieving simplification and reduced size of the structure of the apparatus with respect to this point as well.

On the other hand, both stepping motors 59 and 60 are arranged so that each of their output shafts 59a and 60a are mutually facing in the opposite directions as was previously described. Timing pulleys 56 and 57 respectively provided on nuts 35 and 36 are arranged on the opposite sides of the mutually opposing sides of the nuts 35 and 36 so as to correspond to timing pulleys 62 and 63 fit onto each of said output shafts 59a and 60a. According to the constitution, each body 59b and 60b of stepping motors 59 and 60 and nuts 35 and 36 can be gathered in compact fashion in the direction along the central axis of rotation of each of the nuts as is clear from FIG. 2, thereby enabling the apparatus to be more compact in size.

In the drive apparatus having the above-mentioned constitution, by individually operating both stepping motors 59 and 60, and suitably changing the direction of rotation and rotating speed of each nut 35 and 36, forward and backward movement, rotating movement as well as compound movement can be performed as desired with screw shaft 33, and therefore robot hand 31. Furthermore, the relationship of movement between nuts 35 and 36 and screw shaft 33 is the same as that of the drive apparatus of the prior art shown in FIG. 1, and an explanation of such is omitted since an explanation was previously provided with the table shown in the explanation of the apparatus of the prior art.

Furthermore, the pitches of the two types of screw grooves 33a and 33b formed in screw shaft 33 shown in the present embodiment may be mutually the same or mutually different. However, in the case where the pitches are different, it becomes necessary to change control of the rotating speeds of both nuts 35 and 36 accordingly.

In addition, although two ball screw nuts are provided in the present embodiment, their number can be suitably set to, for example, 4, 6 and so forth corresponding to the need to increase driving force and so forth.

In addition, although the angular radial bearing that supports nuts 35 and 36 as well as the thrust bearing juxtapositioned between said nuts are in the form of ball bearings in the present embodiment, roller bearings may also be used. Moreover, although stepping motors and timing belts are used in the present embodiment, other drive devices, such as servo motors, and transmission devices may also be used.

As has been explained above, in the drive apparatus according to the present invention, since a constitution is employed wherein nuts are made to respectively and mutually approach each other, and their ends are joined while being moved to freely rotate relative to each other, the present invention offers the advantage of achieving reduced size of the driving force generating portion, which includes each nut along with motors that rotate these nuts, particularly in the direction along the central axis of rotation of said nuts.

What is claimed is:

1. A drive apparatus comprising:
   a screw shaft wherein two screw grooves are formed in a state in which they mutually intersect, one of said screw grooves being a left-hand groove and the other of said screw grooves being a right hand groove;
   a plurality of nuts fit loosely onto said screw shaft and provided with ball circulating paths corresponding to each of said screw grooves, respectively;
   a plurality of balls arranged and contained within said ball circulating paths which circulate accompanying relative rotation of said screw shaft and nuts; and
   supporting mechanisms which support each of said nuts so as to be able to rotate freely, and driving devices able to individually rotate and drive each of said nuts;
   wherein said nuts are arranged in close proximity to each other, and their corresponding ends are joined to be fixed relative to one another in the axial direction while being able to freely rotate relative to each other, and a thrust bearing is juxtapositioned between said nuts.

2. The drive apparatus as set forth in claim 1 wherein said support mechanisms have bearings, which support each of said nuts in the vicinity of their mutually opposing ends and at least in the radial direction, and a support member which supports said bearing.

3. The drive apparatus as set forth in claim 2 wherein the bearings that support said nuts are composed of angular radial bearings.

4. A drive apparatus comprising:
   a screw shaft wherein two screw grooves are formed in a state in which they mutually intersect, one of said screw grooves being a left-hand groove and the other of said screw grooves being a right-hand groove; a plurality of nuts fit loosely onto said screw shaft and provided with ball circulating paths corresponding to each of said screw grooves, respectively;
   a plurality of balls arranged and contained within said ball circulating paths which circulate accompanying relative rotation of said screw shaft and nuts; and
   supporting mechanisms which support each of said nuts so as to be able to rotate freely, and driving devices able to individually rotate and drive each of said nuts; each of said nuts;
   wherein said nuts are arranged in close proximity to each other, and their corresponding ends are joined to be fixed relative to one another in the axial direction while being able to freely rotate relative to each other;
   wherein said drive device is composed of timing pulleys fixed coaxially to each of said nuts, and a driving force application device that includes timing belts wrapped around each of said timing pulleys and which applies driving force to said timing pulleys, and said timing pulleys are arranged on the opposite sides of the mutually opposing sides of each of said nuts.

5. The drive apparatus as set forth in claim 1, wherein said drive device is composed of timing pulleys fixed coaxially to each of said nuts, and a driving force application device that includes timing belts wrapped around each of said timing pulleys and which applies driving force to said timing pulleys, and said timing pulleys are arranged on the opposite sides of the mutually opposing sides of each of said nuts.

* * * * *